(12) United States Patent
Raiford

(10) Patent No.: US 7,835,047 B1
(45) Date of Patent: Nov. 16, 2010

(54) BI-DIRECTIONAL INFORMATIONAL ARTICLE WITHIN AN OPTICAL VARIABLE DEVISE

(76) Inventor: Frank D. Raiford, 1013 Timber Neck Mall, Chesapeake, VA (US) 23320

( * ) Notice: Subject to any disclaimer, the term of this patent is extended or adjusted under 35 U.S.C. 154(b) by 545 days.

(21) Appl. No.: 11/827,501

(22) Filed: Jul. 12, 2007

Related U.S. Application Data

(60) Provisional application No. 60/830,303, filed on Jul. 13, 2006.

(51) Int. Cl.
*G03H 1/00* (2006.01)
(52) U.S. Cl. ............................................. 359/2; 283/86

(58) Field of Classification Search ...................... 359/2, 359/567; 283/86
See application file for complete search history.

(56) References Cited

U.S. PATENT DOCUMENTS

| | | | | |
|---|---|---|---|---|
| 5,703,703 | A * | 12/1997 | Yamate | 359/1 |
| 2003/0058491 | A1 * | 3/2003 | Holmes et al. | 359/2 |

* cited by examiner

*Primary Examiner*—Alessandro Amari
(74) *Attorney, Agent, or Firm*—Bowman Green Hampton & Kelly, PLLC

(57) ABSTRACT

An informational article including a holographic film layer and certain additional ink receptive coating, high-opacity blocking, security printing, image receptive coating, ultraviolet reflected core laminate, and/or adhesive layers coupled together. Certain of the layers of the information article include one or more apertures, which, when the apertures overlap, allow the holographic film layer to appear translucent when light is allowed to shine in the area of overlap.

24 Claims, 5 Drawing Sheets

BI-DIRECTIONAL INFORMATIONAL ARTICLE WITHIN AN OPTICAL VARIABLE DEVISE

CROSS-REFERENCE TO RELATED APPLICATIONS

This nonprovisional patent application claims the benefit of U.S. Provisional Patent Application Ser. No. 60/830,303, filed Jul. 13, 2006, the disclosure of which is incorporated herein by reference.

BACKGROUND OF THE INVENTION

Field of the Invention

This invention relates generally to a multi-layered Bi-Directional Optical Variable Devise (BOVD). In particular, the present invention relates to a process for incorporating one or more variable or fixed types of information within a multi-layered BOVD and a BOVD product.

SUMMARY OF THE INVENTION

The present invention relates generally to a process for incorporating one or more variable or fixed types of information within a multi-layered BOVD and a BOVD product produced by that process.

When combining variable and/or fixed data or other design elements into the design structure, a unique BOVD is created. This process allows for the viewing of this information which has been incorporated within the BOVD from the front and back of the structure using available ambient light. The information on the front of the structure is readily visible with the naked eye and the information is also visible on the back of the structure when it is viewed with a light source being transmitted from the front of the structure toward the back of the structure.

This structure can incorporate limitless apertures allowing for varying sizes and shapes that will define the visual appearance of the structure, and the informational article can be populated using numerous printing and imaging technologies and techniques Some of the exemplary technologies used to populate the informational article are: dye sublimation, inkjet, toner based printing, offset lithography, gravure printing, intaglio printing, silkscreen printing, laser etching, laser printing, acid relief demetalization, and/or any other current or later developed technology capable of populating the informational article.

The purpose of the design is to create a unique BOVD that can incorporate photographs, personal information, and/or other fixed or variable data or other design or mechanical elements, within the structure, which allows for viewing and/or reading of this informational article from both the front and back of the structure. This process is unique and will provide for the strong visual and mechanical validation of any article or document requiring security elements.

In addition to the strong visual validation features offered by the BOVD, numerous other security elements may optionally be combined with the BOVD to create additional overt and covert security values.

In various, non-limiting embodiments, one or more Black Light (ultraviolet) excitable core laminates may be combined with the BOVD. An ultraviolet excitable core laminate, when coupled with the BOVD, eliminates the color shifting characteristics of the personalized and fixed data within the structure when illuminated with ultraviolet light. The ultraviolet excited core laminate also allows the viewing of any of the data that has been laser etched into the BOVD on the reverse side of the structure based on the color of the ultraviolet excited core laminate.

In various, non-limiting embodiments, certain data or design elements may be laser etched into the BOVD. Laser etching into the BOVD allows for fixed and or variable data, photographs, logos, or other design elements to be irreversibly and unalterably coupled within the structure and allows for a see thru view of the information from front to back and back to front within the BOVD. This process is counterfeit resistant and allows for visual validation without the aid of any equipment. The only requirement for validation of this feature is some type of light source (sun, moon, artificial light, etc) and a person with the ability to see. This process also allows for machine validation of data or design elements. The data can be read using various current technologies which could include bar codes or any other technology that relies on light to create an interpretable pattern.

In various, non-limiting embodiments, metal detection capabilities can be incorporated into the BOVD. Metal detection capabilities of the BOVD structure allow for additional covert security functionality. In these exemplary embodiments, the BOVD structure is composed partly of a ferrous (or other appropriately detectable) material in a quantity great enough to activate, for example, a hand held metal detector commonly used by Law Enforcement and Homeland Security Officers and yet not enough ferrous material to activate a walk through metal detection system commonly used at airports or at other secure building. This feature, if incorporated, will allow for the validation of the BOVD structure at airports, courthouses, and all public and private locations where document validation is required.

In various, non-limiting embodiments, certain color shifting and movement characteristics of the BOVD are incorporated into the front of the informational article side causing the photographs and/or fixed data or other design elements to color shift and/or move during side-to-side rotation of the article. In these exemplary embodiments, the color shifting or movement characteristics of the BOVD are not evident when viewing the back side of the informational article when it is exposed to a light source from the front side of the structure. This feature allows for additional validation of the security devise and can be validated with minimal training or equipment.

In various, non-limiting embodiments, certain active and/or passive data storage devices or elements can be incorporated into the BOVD. The BOVD platform can allow for the viewing and reading of these storage devices from the front and reverse side of these informational devices. This functionality will allow the data storage element/device to appear to float inside the BOVD or appear to be encapsulated within the BOVD. Some of the data storage devises that may optionally be combined and/or incorporated within the BOVD are computer chips, bar codes, micro fiche, micro and nano-text symbols, magnetic stripe, wire antenna that are either passive or active, magnetic thread, x-ray reflective inks and fibers, metallic fibers, ultraviolet black light reflective inks and materials, infra red reflective inks, laser reactive materials, symbols of various sizes, and/or any other current or later developed technology capable of storing data in or on the informational article.

In various, non-limiting embodiments, biometric information can be incorporated into the BOVD. In these exemplary embodiments, the biometric information can be viewed and read from one or both sides of the structure and provide for the securing of data such as DNA structures, retinal information, finger and hand print information, facial recognition, vein recognition to name a few.

In various, non-limiting embodiments, thermocromatic (heat sensitive) inks and materials may be used in combination with the BOVD. When heat sensitive inks or materials are used in combination with the BOVD, a unique security zone can be created, which allows for the revealing of data that may be concealed within the informational BOVD structure with the aid of a heat source. The source of heat could come, for example, from friction such as a person's finger rubbing rapidly over the security zone, a flashlight, light bulb, or other mechanical or non-mechanical devise or element that would emit heat sufficient to activate the thermocromatic feature of the ink. The thermocromatic ink can be applied on top of or above all or part of the BOVD. The combination of these technologies creates a new security devise that can be used to validate and view the informational article.

In various, non-limiting embodiments, color shifting inks can be incorporated within the BOVD. When color shifting inks are incorporated within the BOVD, the color shifting ink can be viewed from the side of the BOVD with all of the color shifting characteristics of the specified color shifting ink. However, the opposite side of the BOVD will only reveal the primary color of the color shifting ink with none of the color shifting characteristics that are evident on the side of the BOVD with the color shifting ink. The combination of color shifting ink within the BOVD creates a new method and process for the validation of the color shifting ink by creating this unique validation test for this security feature.

When the BOVD is incorporated into a credit card type structure, the methods and structures of this invention allow for linkage of personal information such as photographs, fixed and/or variable data, or other design elements in a manner that is unalterable without detection and is resistant to imitation and duplication. This linkage of data and other design elements in an informational article is critical to establishing a security feature that is easy to identify but difficult replicate.

When the features of the BOVD of this invention are incorporated into a structure similar to paper, the methods and structures of this invention allow for a new medium to print security breeder documents such as birth certificates, passports, stock certificates, titles of registration, labels for brand goods protection, social security cards, checks, and currency to name a few that will provide visual validation of information that is unalterable and difficult to replicate.

Accordingly, this invention provides an information article of improved design.

This invention separately provides an informational BOVD with added visual security.

This invention separately provides an information article with security features that are easy to identify but difficult replicate.

This invention separately provides an added level of visual security to currency, passports, credit cards, informational articles, brand goods protection, breeder documents, and other applications.

These and other features and advantages of this invention are described in or are apparent from the following detailed description of the exemplary embodiments.

BRIEF DESCRIPTION OF THE DRAWINGS

The exemplary embodiments of this invention will be described in detail, with reference to the following figures, wherein like reference numerals refer to like parts throughout the several views, and wherein.

DETAILED DESCRIPTION OF EXEMPLARY EMBODIMENTS

Figure 1:
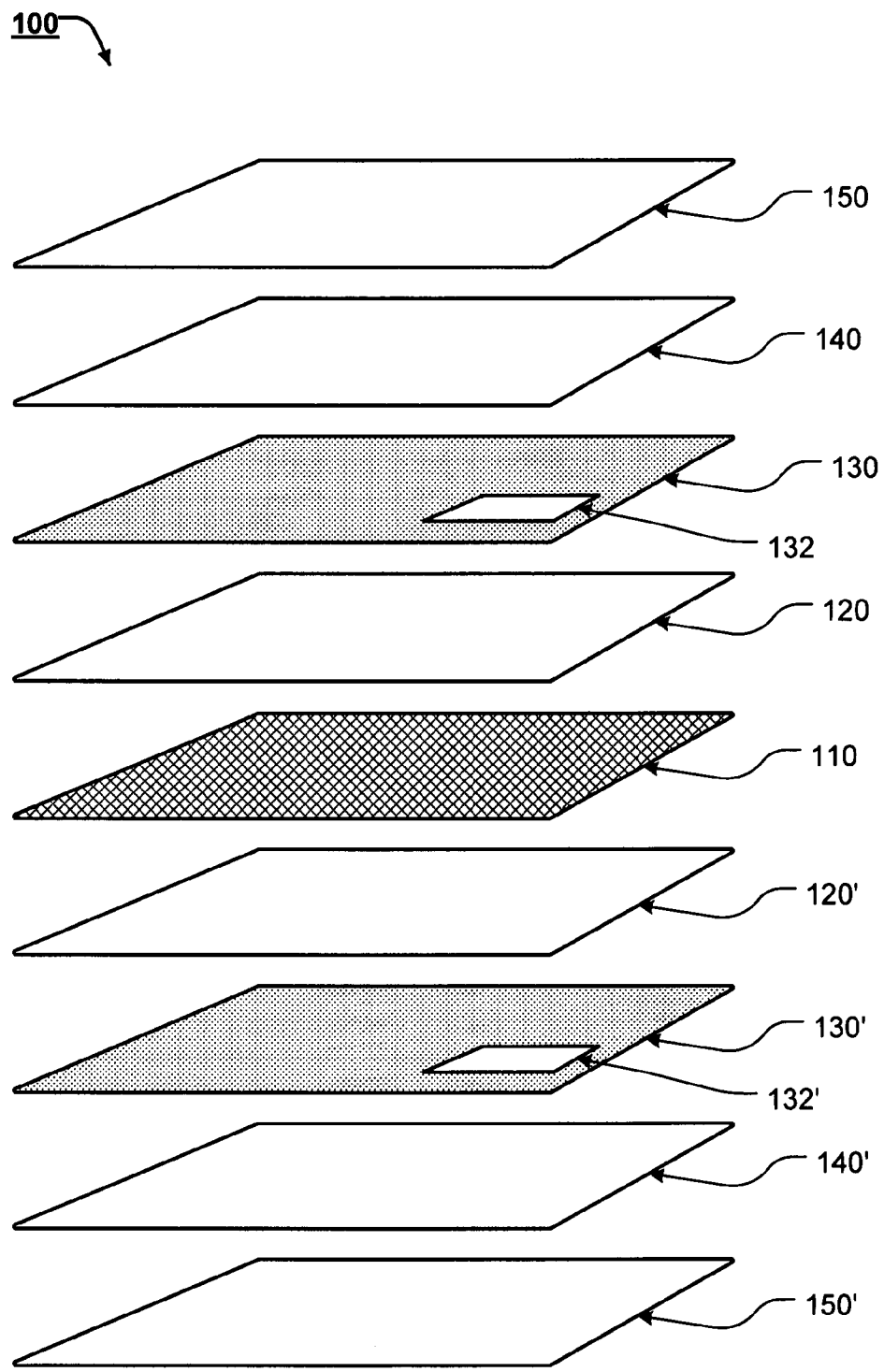
FIG. 1 shows a perspective view of a first exemplary embodiment of an informational article incorporating the systems and methods (HoloView Technology) of to this invention.

For simplicity and clarification, the design factors and operating principles of the informational article according to this invention are explained with reference to various exemplary embodiments of an informational article according to this invention. The basic explanation of the design factors and operating principles of the informational article is applicable for the understanding, design, and operation of the informational article of this invention.

Furthermore, it should be appreciated that, for simplicity and clarification, the embodiments of this invention will be described with reference to the features and elements of this invention being incorporated into an informational article or a BOVD. However, it should be appreciated that the features and elements of this invention may be incorporated into any known or later developed card or article for which security or authentication features are desired.

It should also be appreciated that, as used herein, the terms "informational article" and "BOVD" are used for basic explanation and understanding of the systems, methods, and articles of this invention. Therefore, the terms "informational article" and "BOVD" are not to be construed as limiting the systems, methods, or articles of this invention. Thus, the terms "informational article" and "BOVD" are to be understood to broadly include any article that may require authentication. For example, the terms "informational article" and "BOVD" are to be understood to broadly include any birth certificates, security breeder documents, passports, stock certificates, titles of registration, labels for brand goods protection, social security cards, identification cards, membership cards, credit cards, debit cards, checks, currency, or any other article that involves visual validation of information that is unalterable or difficult to replicate.

It should be understood that, for simplicity and clarification, the embodiments of this invention are described as incorporating or including one or more layers comprising polyester. However, it should be appreciated that polyester is only one exemplary material that may be used to construct the various layers of the informational article of this invention. For example, one or more of the layers of the informational article of this invention may comprise polyethylene (PE), High Density Polyethylene (HDPE), Low Density Polyethylene (LDPE), polypropylene (PP), polystyrene (PS), High impact polystyrene (HIPS), Acrylonitrile butadiene styrene (ABS), polyethylene terephthalate (PET or PETE), polyester (PES), polyamides (PA), other Nylons, polyvinyl chloride (PVC), polyurethane (PU), polycarbonate (PC), polyvinylidene chloride (PVDC), Bayblend (PC/ABS), polymethyl methacrylate (PMMA), Perspex, Oroglas, Plexiglas, polytetrafluoroethylene (PTFE), Teflon, polyetheretherketone (PEEK), polyketone, polyetherimide (PEI) (Ultem), phenolics (PF) or (phenol formaldehydes), Urea-formaldehyde (UF), Melamine formaldehyde (MF), polylactic acid, plastarch material, polyfluoroethylene, polyepoxide, epoxy, glass-reinforced plastic, carbon fiber-reinforced plastic, Dacron, terylene, lexan, Kevlar, Lucite, cellulose-based plastics such as celluloid or rayon, Bakelite or other phenolic plastics, phenol-formaldehyde, and/or other polymers acrylics, silicones, polyurethanes, thermoplastics, thermosets, elastomers, engineering plastics, synthetic rubber, natural rubber, or the like.

Turning now to FIG. 1, FIG. 1 shows a perspective view of a first exemplary embodiment of an informational article 100 incorporating the systems and methods of this invention. As shown in FIG. 1, the informational article 100 includes a plurality of layers.

Beginning at a central layer of the informational article 100 of FIG. 1 and working outward, the informational article 100 comprises a holographic film layer 110. The holographic film layer 110 is produced using known holographic image production methods.

It should be appreciated that, in various exemplary embodiments, the holographic film layer 110 may comprise a partial layer. If the holographic film layer 110 comprises a partial layer, it is preferable that the holographic portion appear in an area corresponding to one or more apertures formed in other of the layers of the information article 100.

In various exemplary embodiments, the holographic film layer 110 is approximately 0.002 inches thick. However, it should be appreciated that the thickness of the holographic film layer 110 is a design choice based on the desired appearance and/or functionality of the informational article 100.

Clear polyester laminate layers 120 and 120' are formed or coupled to either side of the holographic film layer 110. In various exemplary embodiments, the clear polyester laminate layers 120 and 120' are adhesively bonded, molecularly bonded, thermally bonded, or pressure bonded to either side of the holographic film layer 110.

In various exemplary embodiments, the clear polyester laminate layers 120 and 120' are approximately 0.003 inches thick. However, it should be appreciated that the thickness of the clear polyester laminate layers 120 and 120' is a design choice based on the desired appearance and/or functionality of the informational article 100.

High-opacity blocking layers 130 and 130' are formed or coupled to the clear polyester laminate layers 120 and 120', respectively. In various exemplary embodiments, the high-opacity blocking layers 130 and 130' are adhesively bonded, molecularly bonded, thermally bonded, or pressure bonded to the clear polyester laminate layers 120 and 120'.

In various exemplary embodiments, the high-opacity blocking layers 130 and 130' may be formed by applying a high-opacity, visible light, ultraviolet light, or other blocking material or substrate, such as, for example, a high-opacity ink, toner, or other appropriate blocking agent, atop the clear polyester laminate layers 120 and 120', respectively.

As shown in FIG. 1, the high-opacity blocking layers 130 and 130' each include a rectangular aperture 132 and 132', respectively, formed by an opening or void in the high-opacity blocking layer 130. The apertures 132 and 132' represent a HoloView area in the informational article 100. In areas where the aperture 132, formed in the high-opacity blocking layer 130, and the aperture 132', formed in the high-opacity blocking layer 130', overlap, the holographic film layer 110 will appear translucent when light is allowed to shine in the HoloView area. The degree of translucency may be determined based upon the thickness and/or composition of the holographic film layer 110.

It should be appreciated that the size, shape, and number of apertures 132 and 132' formed in the high-opacity blocking layers 130 and 130' is a design choice based on the desired appearance and/or functionality of the informational article 100.

In various exemplary embodiments, the high-opacity blocking layers 130 and 130' are approximately 0.00025 inches thick. However, it should be appreciated that the thickness of the high-opacity blocking layers 130 and 130' is a design choice based on the desired appearance and/or functionality of the informational article 100.

Clear ultraviolet reflected core laminate layers 140 and 140' are formed or coupled to the high-opacity blocking layers 130 and 130', respectively. In various exemplary embodiments, the clear ultraviolet reflected core laminate layers 140 and 140' are adhesively bonded, molecularly bonded, thermally bonded, or pressure bonded to the high-opacity blocking layers 130 and 130'.

In various exemplary embodiments, the clear ultraviolet reflected core laminate layers 140 and 140' are approximately 0.009 inches thick. However, it should be appreciated that the thickness of the clear ultraviolet reflected core laminate layers 140 and 140' is a design choice based on the desired appearance and/or functionality of the informational article 100.

Clear laminate layers 150 and 150' are formed or coupled to the clear ultraviolet reflected core laminate layers 140 and 140', respectively. In various exemplary embodiments, the clear laminate layers 150 and 150 are adhesively bonded, molecularly bonded, thermally bonded, or pressure bonded to the clear ultraviolet reflected core laminate layers 140 and 140'.

In various exemplary embodiments, the clear laminate layers 150 and 150' are approximately 0.002 inches thick. However, it should be appreciated that the thickness of the clear laminate layers 150 and 150' is a design choice based on the desired appearance and/or functionality of the informational article 100.

Figure 2:
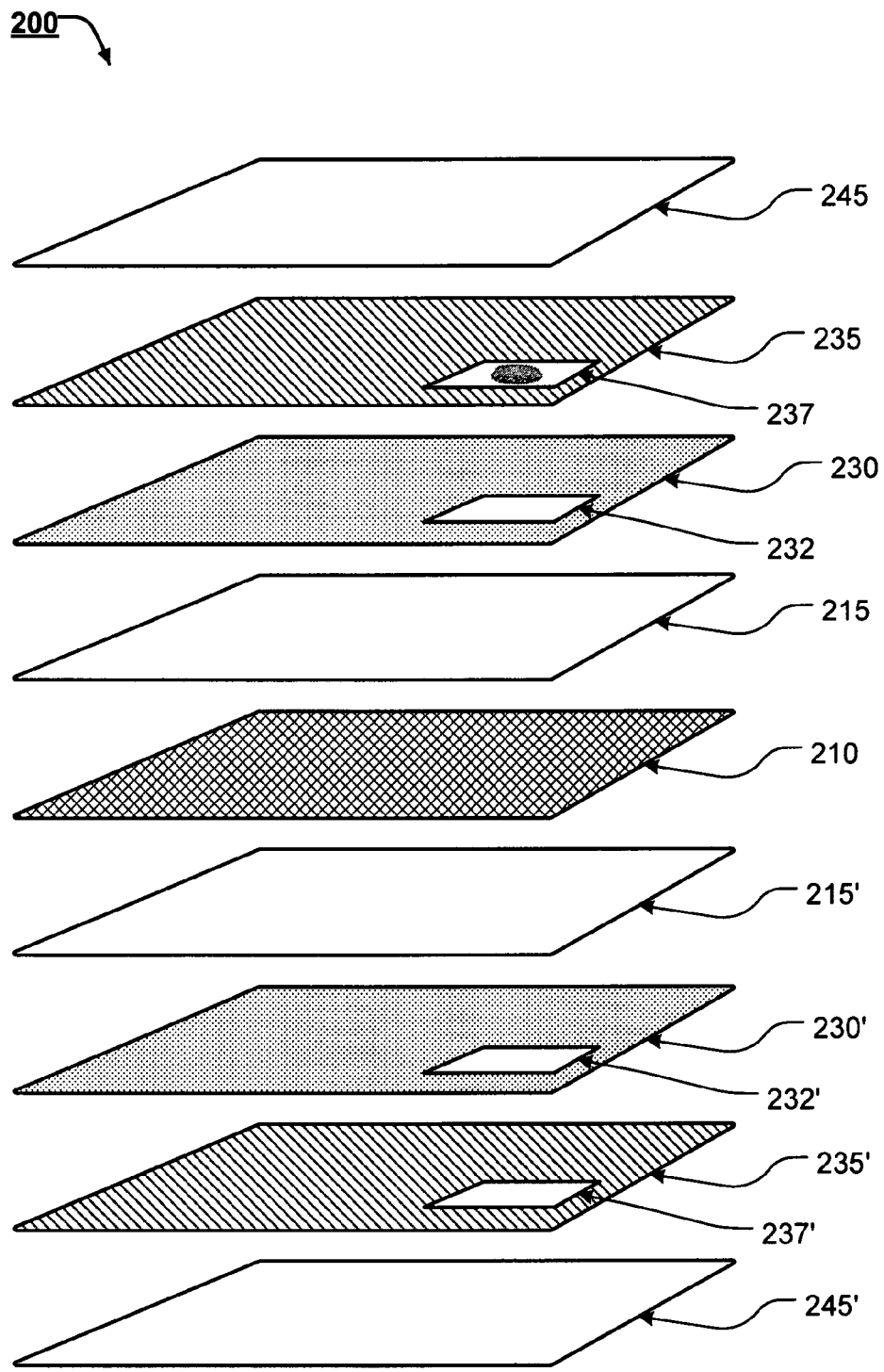
FIG. 2 shows a perspective view of a second exemplary embodiment of an informational article incorporating the systems and methods (HoloView Technology) of to this invention.

FIG. 2 shows a perspective view of a second exemplary, nonlimiting embodiment of an informational article 200 incorporating the systems and methods of this invention. As shown in FIG. 2, the exemplary informational article 200 is a multi-layer birth certificate.

Beginning at a central layer of the informational article 200 of FIG. 2 and working outward, the informational article 200 comprises a polyester holographic film layer 210. The polyester holographic film layer 210 is produced using known holographic image production methods.

It should be understood that, for simplicity and clarification, the embodiments of this invention are described as incorporating or including a polyester holographic film layer, or other material capable of receiving a holographic image. However, it should be appreciated that polyester is only one exemplary material that may be used to construct the holographic film layer and any other type of film or substrates, capable of receiving a holographic image, may be used in place of polyester.

The thickness of the polyester holographic film layer 210 is a design choice based on the desired appearance, level of opacity, and/or functionality of the informational article 200.

Ink receptive coating layers 215 and 215' are formed or coupled on either side of the polyester holographic film layer 210. In various exemplary embodiments, the ink receptive coating layers 215 and 215' comprise a coating that is capable accepting and retaining an ink.

High-opacity blocking layers 230 and 230' are formed or coupled to the ink receptive coating layers 215 and 215', respectively. In various exemplary embodiments, the high-opacity blocking layers 230 and 230' may be formed by applying a high-opacity blocking material or substrate, such as, for example, a high-opacity ink, toner, or other appropriate blocking agent, atop the ink receptive coating layers 215 and 215', respectively.

As shown in FIG. 2, the high-opacity blocking layers 230 and 230' each include a rectangular aperture 232 and 232', respectively, formed by an opening or void in the high-opacity blocking layer 230. The apertures 232 and 23T represent a HoloView area in the informational article 200. In areas where the aperture 232, formed in the high-opacity blocking layer 230, and the aperture 232', formed in the high-opacity blocking layer 230' overlap, the polyester holographic film layer 210 will appear translucent when light is allowed to shine in the HoloView area. The degree of translucency may be determined based upon the thickness and/or composition of the polyester holographic film layer 210.

It should be appreciated that the size, shape, and number of apertures 232 and 232' formed in the high-opacity blocking layers 230 and 230' is a design choice based on the desired appearance and/or functionality of the informational article 200.

The thickness of the high-opacity blocking layers 230 and 230' is a design choice based on the desired appearance and/or functionality of the informational article 200.

A layer of security printing inks 235 and 235' is formed or coupled to the high-opacity blocking layers 230 and 230', respectively. In various exemplary, nonlimiting embodiments, the layer of security printing inks 235 and 235' comprise multi-color security printing inks.

The thickness of the layer of security printing ink(s) 235 and 235' is a design choice based on the desired appearance and/or functionality of the informational article 200.

As shown in FIG. 2, a fingerprint is included in one of the layers of security printing ink(s) 235 and 235'. It should be appreciated that any identifying indicia, such as, for example, an image, identifier, photograph, mark, or the like could be included in place of the fingerprint. Because a fingerprint is included in an area of an aperture 237 and 237', formed in the layers of security printing ink(s) 235 and 235', respectively, and because the apertures 237 and 237' correspond to apertures 232 and 232', the fingerprint will appear superimposed over the translucent portion of the polyester holographic film layer 210 that is visible in the HoloView area in the informational article 200. The degree of translucency may be determined based upon the thickness and/or composition of the polyester holographic film layer 210.

Image receptive coating layers 245 and 245' are formed or coupled to the layer of security printing ink(s) 235 and 235', respectively. The thickness of the image receptive coating layers 245 and 245' is a design choice based on the desired appearance and/or functionality of the informational article 200.

Figure 3:
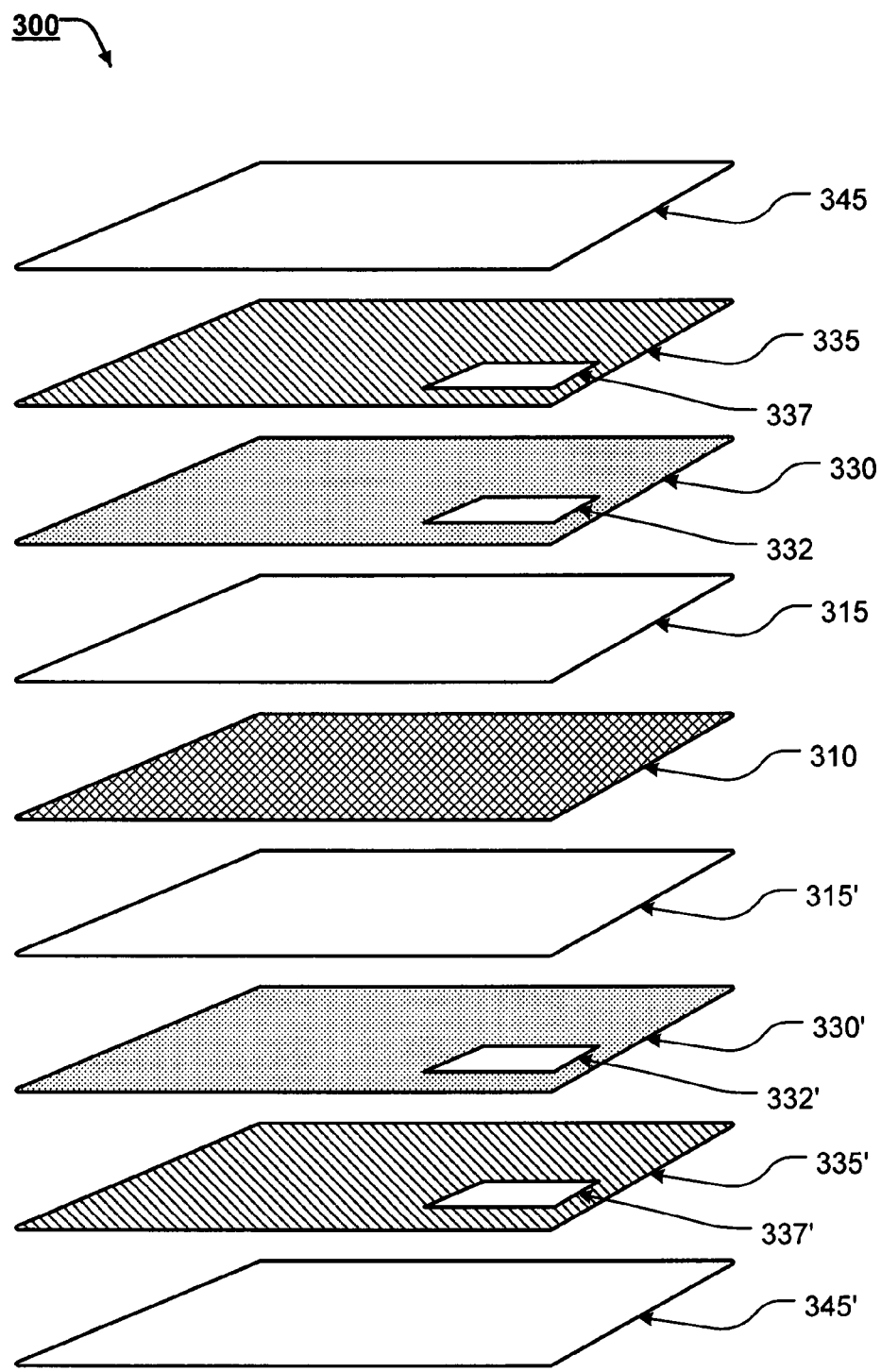
FIG. 3 shows a perspective view of a third exemplary embodiment of an informational article incorporating the systems and methods (HoloView Technology) of to this invention.

FIG. 3 shows a perspective view of a third exemplary embodiment of an informational article 300 incorporating the systems and methods of this invention. As shown in FIG. 3, the informational article 300 is a multi-layer currency.

Beginning at a central layer of the informational article 300 of FIG. 3 and working outward, the informational article 300 comprises a polyester holographic film layer 310. The polyester holographic film layer 310 is produced using known holographic image production methods.

The thickness of the polyester holographic film layer 310 is a design choice based on the desired appearance and/or functionality of the informational article 300.

Ink receptive coating layers 315 and 315' are formed or coupled on either side of the polyester holographic film layer 310. In various exemplary embodiments, the ink receptive coating layers 315 and 315' comprise a coating is capable accepting and retaining an ink.

High-opacity blocking layers 330 and 330' are formed or coupled to the ink receptive coating layers 315 and 315', respectively. In various exemplary embodiments, the high-opacity blocking layers 330 and 330' may be formed by applying a high-opacity blocking material or substrate, such as, for example, a high-opacity ink, toner, or other appropriate blocking agent, atop the ink receptive coating layers 315 and 315', respectively.

As shown in FIG. 3, the high-opacity blocking layers 330 and 330' each include an oval-shaped aperture 332 and 332', respectively, formed by an opening or void in the high-opacity blocking layer 330. The apertures 332 and 332' represent a HoloView area in the informational article 300. In areas where the aperture 332, formed in the high-opacity blocking layer 330, and the aperture 332', formed in the high-opacity blocking layer 330', overlap, the polyester holographic film layer 310 will appear translucent when light is allowed to shine in the HoloView area. The degree of translucency may be determined based upon the thickness and/or composition of the polyester holographic film layer 310.

It should be appreciated that the size, shape, and number of apertures 332 and 332' formed in the high-opacity blocking layers 330 and 330' is a design choice based on the desired appearance and/or functionality of the informational article 300.

The thickness of the high-opacity blocking layers 330 and 330' is a design choice based on the desired appearance and/or functionality of the informational article 300.

A layer of security printing inks 335 and 335' is formed or coupled to the high-opacity blocking layers 330 and 330', respectively. In various exemplary, nonlimiting embodiments, the layer of security printing inks 335 and 335' comprise multi-color security printing inks.

The thickness of the layer of security printing ink(s) 335 and 335' is a design choice based on the desired appearance and/or functionality of the informational article 300.

As shown in FIG. 3, a fingerprint is included in one of the layers of security printing ink(s) 335 and 335'. It should be appreciated that any identifying indicia, such as, for example, an image, identifier, photograph, mark, or the like could be included in place of the fingerprint. Because apertures 337 and 337', formed in the layers of security printing ink(s) 335 and 335', respectively, correspond to the apertures 332 and 332', the translucent portion of the polyester holographic film layer 310 will be visible in the HoloView area in the informational article 300. The degree of translucency may be determined based upon the thickness and/or composition of the polyester holographic film layer 310.

Image receptive coating layers 345 and 345' are formed or coupled to the layer of security printing ink(s) 335 and 335', respectively. The thickness of the image receptive coating layers 345 and 345' is a design choice based on the desired appearance and/or functionality of the informational article 300.

Figure 4:
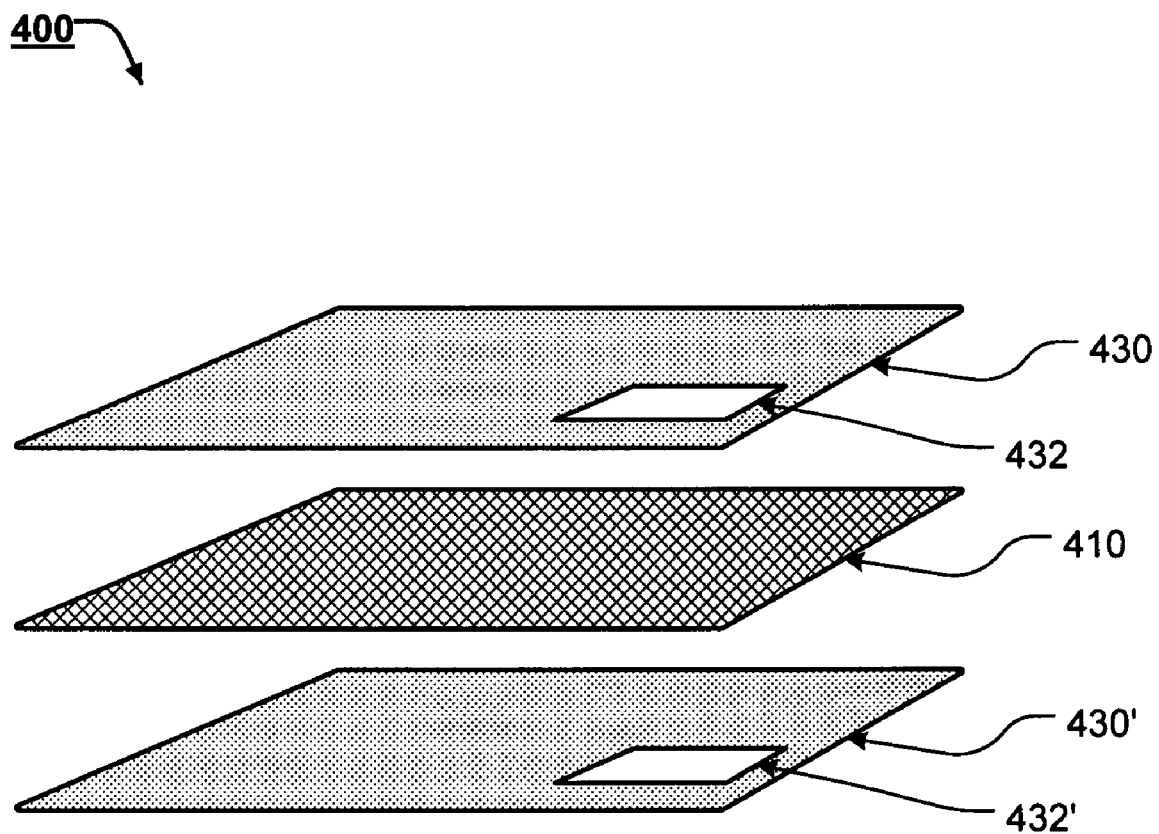
FIG. 4 shows a perspective view of a fourth exemplary embodiment of an informational article incorporating the systems and methods (HoloView Technology) of to this invention.

FIG. 4 shows a perspective view of a fourth exemplary embodiment of an informational article 400 incorporating the systems and methods of this invention. As shown in FIG. 4, the informational article 400 is a multi-layer composite card.

Beginning at a central layer of the informational article 400 of FIG. 4 and working outward, the informational article 400 comprises a polyester holographic film layer 410. The polyester holographic film layer 410 is produced using known holographic image production methods.

The thickness of the polyester holographic film layer 410 is a design choice based on the desired appearance and/or functionality of the informational article 400.

High-opacity blocking layers 430 and 430' are formed or coupled on either side of the polyester holographic film layer 410. In various exemplary embodiments, the high-opacity blocking layers 430 and 430' may be formed by applying a high-opacity blocking material or substrate, such as, for example, a high-opacity ink, toner, or other appropriate blocking agent, on either side of the polyester holographic film layer 410.

As shown in FIG. 4, the high-opacity blocking layers 430 and 430' each include an oval-shaped aperture 432 and 432', respectively, formed by an opening or void in the high-opacity blocking layer 430. The apertures 432 and 432' represent a HoloView area in the informational article 400. In areas where the aperture 432, formed in the high-opacity blocking layer 430, and the aperture 432', formed in the high-opacity blocking layer 432', overlap, the polyester holographic film layer 410 will appear translucent when light is allowed to shine in the HoloView area. The degree of translucency may be determined based upon the thickness and/or composition of the polyester holographic film layer 410.

It should be appreciated that the size, shape, and number of apertures 432 and 432' formed in the high-opacity blocking layers 430 and 430' is a design choice based on the desired appearance and/or functionality of the informational article 400.

The thickness of the high-opacity blocking layers 430 and 430' is a design choice based on the desired appearance and/or functionality of the informational article 400.

Figure 5:
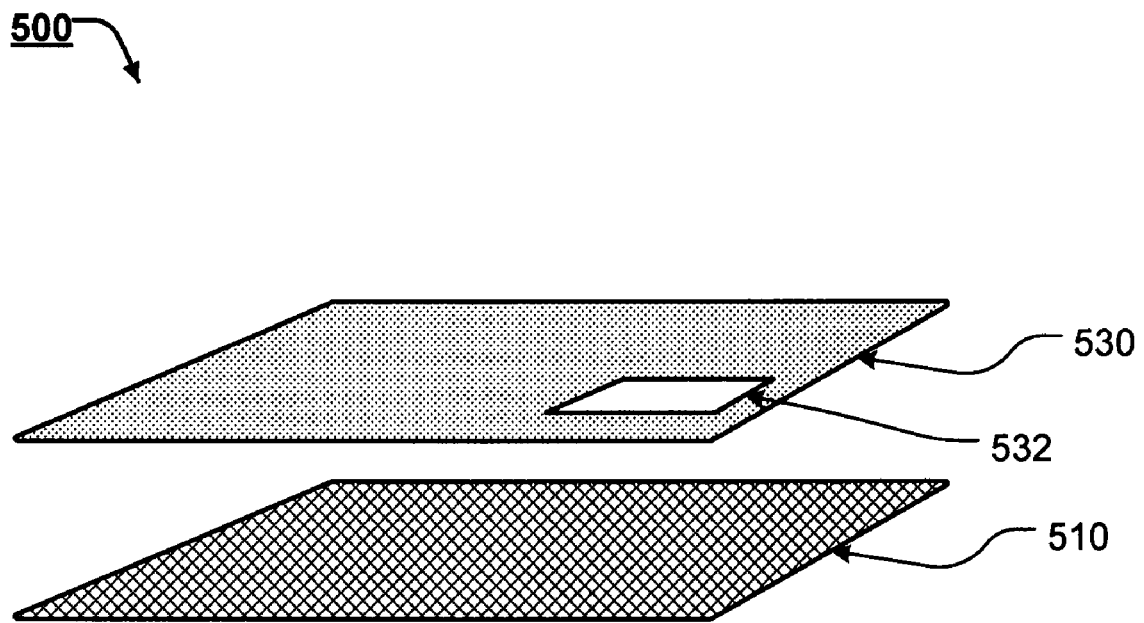
FIG. 5 shows a perspective view of a fifth exemplary embodiment of an informational article incorporating the systems and methods (HoloView Technology) of to this invention.

FIG. 5 shows a perspective view of a fifth exemplary embodiment of an informational article 500 incorporating the systems and methods of this invention. As shown in FIG. 5, the informational article 500 is a two-layer composite card.

As a first layer, the informational article 500 comprises a polyester holographic film layer 510. The polyester holographic film layer 510 is produced using known holographic image production methods.

The thickness of the polyester holographic film layer 510 is a design choice based on the desired appearance and/or functionality of the informational article 500.

A high-opacity blocking layer 530 is formed or coupled on a side of the polyester holographic film layer 510. In various exemplary embodiments, the high-opacity blocking layer 530 is formed by applying a high-opacity blocking material or substrate, such as, for example, a high-opacity ink, toner, or other appropriate blocking agent, on a side of the polyester holographic film layer 510.

As shown in FIG. 5, the high-opacity blocking layer 530 includes an oval-shaped aperture 532 formed by an opening or void in the high-opacity blocking layer 530. The aperture 532 represents a HoloView area in the informational article 500. In each of the HoloView areas of the informational article 500, the polyester holographic film layer 510 will appear translucent when light is allowed to shine in the HoloView area. The degree of translucency may be determined based upon the thickness and/or composition of the polyester holographic film layer 510.

It should be appreciated that the size, shape, and number of apertures 532 formed in the high-opacity blocking layer 530 is a design choice based on the desired appearance and/or functionality of the informational article 500.

The thickness of the high-opacity blocking layer 530 is a design choice based on the desired appearance and/or functionality of the informational article 500.

While this invention has been described in conjunction with the exemplary embodiments outlined above, it is evident that many alternatives, modifications, and variations will be apparent to those skilled in the art. Such adaptations and modifications should and are intended to be comprehended within the meaning and range of equivalents of the disclosed exemplary embodiments. It is to be understood that the phraseology of terminology employed herein is for the purpose of description and not of limitation. Accordingly, the foregoing description of the exemplary embodiments of the invention, as set forth above, are intended to be illustrative, not limiting. Various changes, modifications, and/or adaptations may be made without departing from the spirit and scope of this invention.

What is claimed is:

1. An informational article comprising:
a holographic film layer having a top side and a bottom side;
a first substantially clear polyester laminate layer having a top side and a bottom side, wherein the bottom side of the first substantially clear polyester laminate layer is coupled to the top side of the holographic film layer;
a second substantially clear polyester laminate layer having a top side and a bottom side, wherein the top side of the second substantially clear polyester laminate layer is coupled to the bottom side of the holographic film layer;
a first high-opacity blocking layer having a top side and a bottom side, wherein the bottom side of the first high-opacity blocking layer is coupled to the top side of the first substantially clear polyester laminate layer, wherein the first high-opacity blocking layer comprises at least one aperture, wherein the at least one aperture is formed by a void in the first high-opacity blocking layer;
a second high-opacity blocking layer having a top side and a bottom side, wherein the top side of the second high-opacity blocking layer is coupled to the bottom side of the second substantially clear polyester laminate layer, wherein the second high-opacity blocking layer comprises at least one aperture, wherein the at least one aperture is formed by a void in the second high-opacity blocking layer, such that in areas where the aperture formed in the first high-opacity blocking layer and the aperture formed in the second high-opacity blocking layer overlap, the holographic film layer appears translucent when light is allowed to shine in an area of overlap;
a first substantially clear ultraviolet reflected core laminate layer having a top side and a bottom side, wherein the bottom side of the first substantially clear ultraviolet reflected core laminate layer is coupled to the top side of the first high-opacity blocking layer;
a second substantially clear ultraviolet reflected core laminate layer having a top side and a bottom side, wherein the top side of the second substantially clear ultraviolet reflected core laminate layer is coupled to the bottom side of the second high-opacity blocking layer;

a first substantially clear laminate layer having a top side and a bottom side, wherein the bottom side of the first substantially clear laminate layer is coupled to the top side of the first substantially clear ultraviolet reflected core laminate layer; and a second substantially clear laminate layer having a top side and a bottom side, wherein the top side of the second substantially clear laminate layer is coupled to the bottom side of the second substantially clear ultraviolet reflected core laminate layer.

2. The informational article of claim 1, wherein the first substantially clear polyester laminate layer and the second substantially clear polyester laminate layer are each adhesively coupled to the holographic film layer.

3. The informational article of claim 1, wherein the first high-opacity blocking layer is adhesively coupled to the first substantially clear polyester laminate layer and the second high-opacity blocking layer is adhesively coupled to the second substantially clear polyester laminate layer.

4. The informational article of claim 1, wherein the first substantially clear ultraviolet reflected core laminate layer is adhesively coupled to the first high-opacity blocking layer and the second substantially clear ultraviolet reflected core laminate layer is adhesively coupled to the second high-opacity blocking layer.

5. The informational article of claim 1, wherein the first substantially clear laminate layer is adhesively coupled to the first substantially clear ultraviolet reflected core laminate layer and the second substantially clear laminate layer is adhesively coupled to the second substantially clear ultraviolet reflected core laminate layer.

6. The informational article of claim 1, wherein an identifying indicia is included in an area of an aperture formed in at least one of the first high-opacity blocking layer or the second high-opacity blocking layer.

7. The informational article of claim 1, wherein the holographic film layer is approximately 0.002 inches thick.

8. The informational article of claim 1, wherein the holographic film layer comprises polyester.

9. The informational article of claim 1, wherein each polyester laminate layer is approximately 0.003 inches thick.

10. The informational article of claim 1, wherein the high-opacity blocking layers comprise a high-opacity blocking material or substrate.

11. The informational article of claim 1, wherein the high-opacity blocking layers comprise a high-opacity ink.

12. The informational article of claim 1, wherein the high-opacity blocking layers comprise a high-opacity toner.

13. The informational article of claim 1, wherein each high-opacity blocking layer is approximately 0.00025 inches thick.

14. The informational article of claim 1, wherein a degree of translucency of the holographic film layer is determined based upon the thickness of the holographic film layer.

15. The informational article of claim 1, wherein a degree of translucency of the holographic film layer is determined based upon the composition of the holographic film layer.

16. The informational article of claim 1, wherein each ultraviolet reflected core laminate layer is approximately 0.009 inches thick.

17. The informational article of claim 1, wherein each substantially clear laminate layer is approximately 0.002 inches thick.

18. An informational article comprising:
a holographic film layer having a top side and a bottom side;
a first ink receptive coating layer, wherein the first ink receptive coating layer is coupled to the top side of the holographic film layer, wherein the first ink receptive coating layer comprises at least one aperture, wherein the at least one aperture is formed by a void in the first ink receptive coating layer;
a second ink receptive coating layer, wherein the second ink receptive coating layer is coupled to the bottom side of the holographic film layer, wherein the second ink receptive coating layer comprises at least one aperture, wherein the at least one aperture is formed by a void in the second ink receptive coating layer;
a first high-opacity blocking layer having a top side and a bottom side, wherein the bottom side of the first high-opacity blocking layer is coupled to the first ink receptive coating layer, wherein the first high-opacity blocking layer comprises at least one aperture, wherein the at least one aperture is formed by a void in the first high-opacity blocking layer;
a second high-opacity blocking layer having a top side and a bottom side, wherein the top side of the second high-opacity blocking layer is coupled to the second ink receptive coating layer, wherein the second high-opacity blocking layer comprises at least one aperture, wherein the at least one aperture is formed by a void in the second high-opacity blocking layer;
a first security printing layer, wherein the first security printing layer is coupled to the top side of the first high-opacity blocking layer, wherein the first security printing layer comprises at least one aperture, wherein the at least one aperture is formed by a void in the first security printing layer;
a second security printing layer, wherein the second security printing layer is coupled to the bottom side of the second high-opacity blocking layer, wherein the second security printing layer comprises at least one aperture, wherein the at least one aperture is formed by a void in the second security printing layer;
a first image receptive coating layer having a top side and a bottom side, wherein the bottom side of the first substantially clear image receptive coating layer is coupled to the top side of the first security printing layer, wherein the first image receptive coating layer comprises at least one aperture, wherein the at least one aperture is formed by a void in the first image receptive coating layer;
a second image receptive coating layer having a top side and a bottom side, wherein the top side of the second substantially clear image receptive coating layer is coupled to the bottom side of the second security printing layer, wherein the second image receptive coating layer comprises at least one aperture, wherein the at least one aperture is formed by a void in the second image receptive coating layer; and
wherein in areas where the apertures formed in the first ink receptive coating layer, the second ink receptive coating layer, the first high-opacity blocking layer, the second high-opacity blocking layer, the first security printing layer, and the second security printing layer overlap, the holographic film layer appears translucent when light is allowed to shine in an area of overlap.

19. The informational article of claim 18, wherein the ink receptive coating layers comprise a coating is capable accepting and retaining an ink.

20. The informational article of claim 18, wherein an identifying indicia is included in an area of an aperture formed in at least one of the first security printing layer, the second security printing layer, the first high-opacity blocking layer, or the second high-opacity blocking layer.

21. The informational article of claim 18, wherein the security printing layer comprises multi-color security printing inks.

22. An informational article comprising:
a holographic film layer having a top side and a bottom side;
a first high-opacity blocking layer having a top side and a bottom side, wherein the bottom side of the first high-opacity blocking layer is coupled to the top side of the holographic film layer, wherein the first high-opacity blocking layer comprises at least one aperture, wherein the at least one aperture is formed by a void in the first high-opacity blocking layer;
a second high-opacity blocking layer, wherein the second high-opacity blocking layer comprises at least one aperture, wherein the at least one aperture in the second high-opacity blocking layer is formed by a void in the second high-opacity blocking layer
wherein in areas where the apertures formed in the first high-opacity blocking layer and the second high-opacity blocking layer overlap, the holographic film layer appears translucent when light is allowed to shine in an area of overlap.

23. The informational article of claim 22, wherein an identifying indicia is included in an area of an aperture formed in at least one of the first high-opacity blocking layer or the second high-opacity blocking layer.

24. The informational article of claim 22, further comprising a second high-opacity blocking layer having a top side and a bottom side, wherein the top side of the second high-opacity blocking layer is coupled to the bottom side of the holographic film layer.

* * * * *